United States Patent [19]
Joseph et al.

[11] Patent Number: 5,802,560
[45] Date of Patent: Sep. 1, 1998

[54] MULTIBUS CACHED MEMORY SYSTEM

[75] Inventors: James Dean Joseph, Monument; Doyle James Heisler; Dion Nickolas Heisler, both of Colorado Springs, all of Colo.

[73] Assignee: Ramton International Corporation, Colorado Springs, Colo.

[21] Appl. No.: 521,597

[22] Filed: Aug. 30, 1995

[51] Int. Cl.$^6$ ........................................................ G06F 12/00
[52] U.S. Cl. .......................................... 711/119; 711/113
[58] Field of Search .............................. 395/290, 403, 395/445, 460, 469, 473, 309, 449; 711/119

[56] References Cited

U.S. PATENT DOCUMENTS

| | | | |
|---|---|---|---|
| 5,249,282 | 9/1993 | Segers | 395/449 |
| 5,257,367 | 10/1993 | Goodlander | 395/600 |
| 5,293,603 | 3/1994 | MacWilliams et al. | 395/309 |
| 5,355,467 | 10/1994 | MacWilliams et al. | 395/473 |
| 5,361,391 | 11/1994 | Westberg | 395/464 |
| 5,408,636 | 4/1995 | Santeler | 395/490 |
| 5,517,626 | 5/1996 | Archer et al. | 395/290 |

FOREIGN PATENT DOCUMENTS

| | | |
|---|---|---|
| 0489 583 A2 | 6/1992 | European Pat. Off. . |
| 0588 369 A1 | 9/1993 | European Pat. Off. . |
| 0 627 688 A1 | 12/1994 | European Pat. Off. . |
| WO 96/11430 | 4/1996 | WIPO . |

OTHER PUBLICATIONS

Ramtron Specialty Memory Products Catalog, Oct. 1994, Colorado Springs, Colorado.
"High Speed Bus Arbiter for Bus–Oriented Multiprocessor Systems," IBM Technical Disclosure Bulletin, vol. 28, No. 2, Jul. 1985, pp. 567–579.
"PCT Local Bus Specification Revision 2.0," PCI Special Interest Group, Hillsboro, OR (1993), pp. 9–18, 28–40.
Kendall, Guy W., "Hands on Under the Hood—Inside the PCT Local Bus," BYTE, Feb. 1994, pp. 177–180.

Primary Examiner—Tod R. Swann
Assistant Examiner—David Langjahr
Attorney, Agent, or Firm—Peter J. Meza, Esq.; Carol W. Burton, Esq.; William J. Kubida, Esq.

[57] ABSTRACT

A method and apparatus for use in computer systems utilizes a memory chip employing multiple distributed SRAM caches directly linked to a single DRAM main memory block. Each cache is directly linked to a different bus. Each chip further contains a partially distributed arbitration and control circuit for implementing cache policy and arbitrating memory refresh cycles.

34 Claims, 6 Drawing Sheets

MULTIBUS CACHED MEMORY SYSTEM

BACKGROUND OF THE INVENTION

1. Field of Invention

The present invention relates to the field of computer systems, more particularly the present invention relates to a method and apparatus for a multibused cached memory system for use in computer systems.

2. Background of Invention

The classic pattern of improvement in computer technology over the past decade has been increases in performance taking place concurrently with decreasing prices. At the heart of these performance improvements has been the ability to speed up the throughput of the computer. In the classic architecture, a computer consists of a central processing-unit (CPU) connected through a local bus to a memory unit. The processor and memory unit moved in a lock-step fashion with their actions synchronized by a single clock. Fortunately, improvements in the technology resulted in far faster processes and far cheaper memory. A point of conflict arose, however, with the local bus architecture limiting the fast processor to the slower clock speeds required by the large, inexpensive memory.

This bottleneck was first removed by IBM in 1984 with the introduction of the PC-AT and later codified by the Industry Standard Architecture (ISA) in 1988. Under that architecture the CPU could run at a faster clock speed than memory. This performance improvement was achieved by providing two buses: one for the CPU known as a local bus and one for the rest of the system including memory known as a system bus. A drawback to this architecture was that the CPU managed all bus traffic. Therefore, during RAM updates from main memory and data transfers between memory and peripheral devices, the CPU had to run at the slower system bus clock speed. In either of these cases, CPU performance was not optimal.

The next step in performance improvement was embodied in the IBM Micro Channel Architecture (MCA) introduced in 1988 on the PS/2 line of computers. In this architecture management of bus traffic as between the local and the system bus was handled by a special control circuit rather than the CPU. This removed the CPU from full time bus management, thereby removing one of the constraints on the CPU's performance.

Not, however, until the introduction of cache memory was the CPU performance during memory accesses improved. This performance improvement was achieved by making a high speed, locally accessed copy of memory available to the CPU so that even during memory accesses the CPU would not always need to operate at the slower speeds of the system bus. This method of copying memory is referred to as caching a memory system and is a technique made possible by virtue of the fact that much of the CPU access as determined by the computer source code itself is in small, highly repetitive address spaces which once copied up from memory can be utilized through many bus cycles before needing to be refreshed with the next address block. This method of memory copying is advantageous on the read cycles of a computer which studies have shown, in contrast to the write cycles, constitute 90% of the external accesses of a CPU.

The most popular hardware realization of a cached memory incorporates SRAM cache and DRAM main memory. A proprietary Enhanced DRAM (EDRAM) chip developed by Ramtron International Corporation, 1850 Ramtron Drive, Colorado Springs, Colo. 80921, incorporates both these memories on one chip. Access to the chip is provided by a single bus. The product line is described in that company's "Specialty Memory Products Data Book," October 1994, which is herein incorporated by reference.

The most popular expansion bus capable of processor independent handling of multiple peripherals is the Peripheral Component Interconnect (PCI®) bus. The specifications for this bus are set forth in revision 2.0 specification as provided by the PCI Special Interest Group, M/S HF3-15A, 5200 Northeast Elam Young Parkway, Hillsboro, Oreg. 97124, which is herein incorporated by reference.

The problem which the prior art has not addressed and which needs to be addressed in order to further improve system performance is that a unified cache copy of main memory when shared between multiple CPU's or a single CPU and several buses results in cache copies which at any point in time are not optimized for the traffic on any one master unit, be it a CPU or an external I/O device. This fact ends up degrading cache performance. What is needed is a way to provide optimal caching performance in a multibus, multiclock, multiprocessor environment.

SUMMARY OF THE INVENTION

The method and apparatus of the current invention relates to a multibus cache memory system for use in computer systems. The system employs distributed cache, cache arbitration and control. All caches are tightly coupled to main memory. In a tightly coupled memory array, different devices all have access and place competing demands on a unified main memory.

The current invention provides cache memory distributed by bus, by memory block, and by row within each cache within each memory block.

Specifically disclosed is a memory chip containing multiple SRAM caches directly linked to a single DRAM memory block. Each chip further contains a partially distributed arbitration and control circuit for implementing cache policy and arbitrating memory refresh cycles. Each cache on the chip is directly linked to either a local or a PCI bus. Because each cache is dedicated to a specific bus and/or device, the copy contained in cache is more likely to be relevant to the next read cycle of the device which is being serviced by that cache than would be the case if there were only one cache serving multiple devices. Thus system performance is improved. The cache system employs a modified write-through configuration. Cache coherency is dealt with at a chip level rather than a bus level. Snooping is, therefore, not required; rather a simple comparator circuit is disclosed for maintaining memory block-level cache coherency. Each chip is connected to a system level control and arbitration unit which determines, in the event of concurrent demands from separate buses, which bus shall have priority access to a memory block.

Broadly, disclosed herein is a process for controlling and arbitrating cache policy. The process disclosed accounts for: handling competing demands of different buses with different clocks, determining whether an access request is for memory or I/O, implementing read/write hit and miss policy, maintaining distributed cache coherency for write hits, and managing DRAM refresh.

Further disclosed herein is a computer including a Pentium® CPU operating on a local bus and a peripheral device operating on a PCI bus. Each bus is tightly coupled to the distributed cache memory system. The arbitration and control circuit and policy for this preferred embodiment is set forth.

BRIEF DESCRIPTION OF THE DRAWINGS

A better understanding of the present invention can be obtained when the following detailed description of the preferred embodiment is considered in conjunction with the following drawings in which.

DETAILED DESCRIPTION OF THE PREFERRED EMBODIMENT

Figure 1:
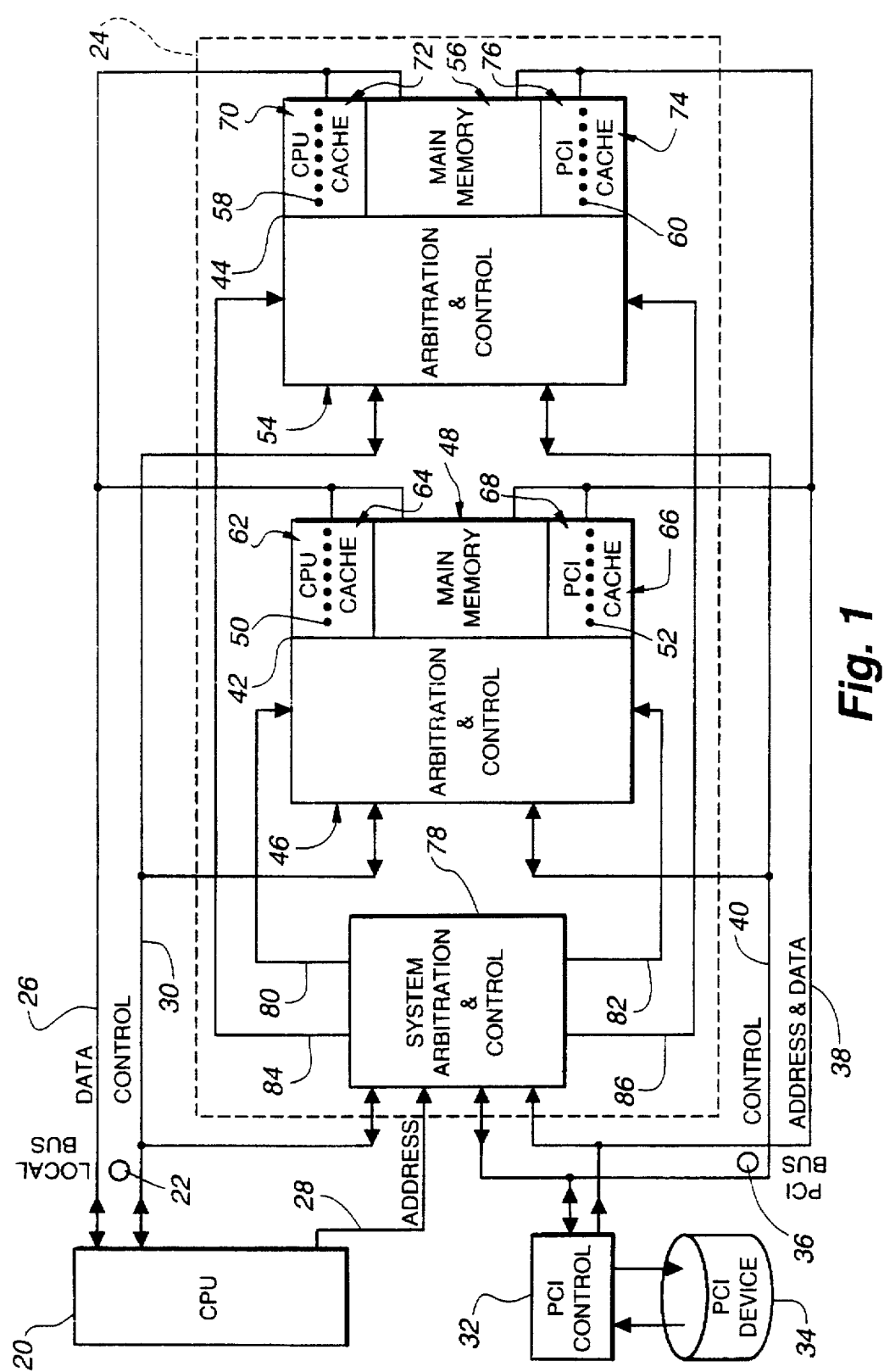
FIG. 1 is a block diagram of a computer incorporating the present invention.

A multibus, multiclock, multidevice, distributed cache memory system for use in computers is hereby disclosed. The system utilizes distributed cache in conjunction with distributed cache arbitration and control.

In order to bridge the gap between fast processors, DMA devices, or PCI masters, and slow, tightly coupled memory, a cache memory is critical. Cache memory is a small amount of very fast memory that is used to store a copy of frequently accessed code and data from main memory. The microprocessor(s), the PCI bus master(s), and the DMA device(s) can operate out of this very fast cache memory and thereby reduce the number of wait states that must be interposed during memory access.

The current invention calls for all buses, servicing CPU, DMA, or PCI devices, to share memory in a tightly coupled arrangement. The advantage of a tightly coupled arrangement is that each device has equal access to main memory.

Cache thrashing would normally negate many of the benefits of a tightly coupled arrangement. By thrashing is meant the repeated insertion and removal of data from a cache. This is particularly likely to occur where more than one device, each with a different address requirement, is sharing the same cache. Therefore, it is advantageous that cache be distributed with respect to the main memory.

Distributed Cache

According to the current invention, it is advantageous to distribute cache along what may be considered three axes. The first axis will be called the bus axis, the second axis will be called the memory block axis, and the third axis will be called the cache row axis. It is advantageous that there be at least one cache devoted to each bus. A bus may serve more than one device and each bus may run at a different clock speed. The dimension of the first axis is, therefore, the number of buses.

It is further advantageous that main memory, both for hardware and throughput reasons, be divided into memory address blocks and that each of these memory address blocks subdivide the cache devoted to each bus so that each memory block has at least one cache per bus. The dimension of the second axis is, therefore, the number of discrete memory blocks. If, for example, there are two buses and main memory is divided into two blocks, then each block would contain two caches, each devoted to a different bus, for a total of four caches.

It is further advantageous that within each cache in a memory block there be multiple address rows. This is advantageous because the cache herein described may well be performing in an L2 relationship to any one of the devices on the bus which it is servicing. In this case, it is advantageous that the cache so characterized as L2 be significantly larger than the onboard cache of the device that it may be servicing so as to enhance, by increasing the read hit rate, the performance of the device it is servicing. The dimension of the third axis is, therefore, the number of address rows in each cache associated with a specific memory block and with a specific bus connected to that memory block.

Distributed Control and Arbitration

Of equal importance to the distribution of cache is the distribution of cache control and/or arbitration. By cache control is meant the characterization of a cache request as either a read or a write and the subsequent implementation of appropriate policy in response to a hit or a miss. By cache arbitration is meant the resolution of the competing demands on cache as between multiple devices operating at multiple clock speeds in a memory environment which may, independent of the access demands, also require intermittent memory refreshing as is the case with DRAM. Distribution of cache control and arbitration to the memory block-level, as opposed to the system level, allows for higher memory throughput. This latter feature is the result of the parallelism resulting from multiple control and arbitration decisions made simultaneously at a local level as opposed to serially at a global system controller level.

The cache policies implemented herein are, with respect to reads, best characterized as a distributed, partially set-associative cache. By this is meant that each main memory location is mapped to the cache of a specific memory block.

The write policy is best described as a distributed write-through. By this is meant that a write request from any device is immediately satisfied by direct access to the appropriate main memory block. Coherency is maintained through a set of simple comparator operations between those cache associated with a specific memory block. Cache coherency is the term given to the problem of assuring that the contents of cache memory and those of main memory for all caches in a memory block are either identical or under tight enough control that stale and current data are not confused with each other. The term "stale data" is used to describe data locations which no longer reflect the current value of the memory location they once represented. Therefore a write to cache will only update those caches which contain the same address as that being updated in main memory. A simple memory block-level comparator circuit can be used to maintain cache coherancy, because cache policy calls for write-through to main memory and because architecturally cache is directly connected to each main memory block, rather than being separated from main memory by a bus. As a result, no bus level snooping is required to maintain cache coherency.

Apparatus

The apparatus of the present invention is most generally shown in one preferred embodiment in FIG. 1. FIG. 1 is a system level block diagram of the popular Intel Pentium® CPU 20, operating on local bus 22 access to a distributed memory 24 comprising SRAM cache and DRAM main memory. The local bus comprises data line 26, address line 28 and control line 30. A PCI controller 32 and device 34 are also shown linked to distributed cache and main memory 24 by a PCI bus 36. The PCI bus operates at a slower clock speed than the local bus 22. The PCI bus comprises a multiplexed address and data line 38 and a control line 40.

The three axis cache policy discussed above is represented diagrammatically in FIG. 1 in the following manner. Memory is broken down into two blocks: Block A 42 and Block B 44. Block A comprises an arbitration and control unit 46, a main memory 48, a cache 50 devoted to the local bus 22 and a cache 52 devoted to the PCI bus 36. Block B is similarly configured, comprising an arbitration and control unit 54, a main memory 56, a cache 58 devoted to the local bus and a cache 60 devoted to the PCI bus. Within each cache there are two address rows. Cache 50 includes rows 62, 64; cache 52 includes rows 66, 68; cache 58 includes rows 70, 72; and cache 60 includes rows 74, 76. Therefore, the unit value for the bus axis is 2, the unit value for the memory block is 2, and the unit value for the cache row is 2. The number of distributed caches is the triple product of the unit numbers of each axis or in this case 2×2×2=8.

As further shown in FIG. 1, a partially distributed cache arbitration and control policy is implemented in this preferred embodiment. In general, the more distributed the cache arbitration and control, the faster the system throughput. In this particular preferred embodiment, a partially distributed arrangement has been shown in order to conserve memory block real estate. Partial arbitration and control occurs at a system level in system control and arbitration unit 78 which is used to arbitrate priority between concurrent requests; to determine whether a request for an address mapped to either memory or input/output is in fact for memory; and to control which memory block is being addressed. Additionally, unit 78 can promote pipelining behavior in the memory blocks. For example, if there are consecutive read requests on the CPU local bus that are directed to different memory blocks then while the first request is being output by one memory block to the local bus the second memory block can begin the processing of the next read request. These processes are shown in process flow diagram in FIG. 3A. The system control and arbitration unit 78 is connected by address and command line 80 and control line 82 to memory block 42, and by address and command line 84 and control line 86 to memory block 44. This replication of address and control lines between the system control and arbitration unit 78 and the memory blocks allows for increased throughput by providing for concurrent memory access to different blocks by each bus.

The other portion of the arbitration and control environment is in control and arbitration units 46 and 54 associated respectively with Block A 42 and Block B 44. Generally these control cache read/write policy, and arbitrate between memory access and memory refresh as required by the volatile DRAM of main memory units 48, 56.

Figure 2:
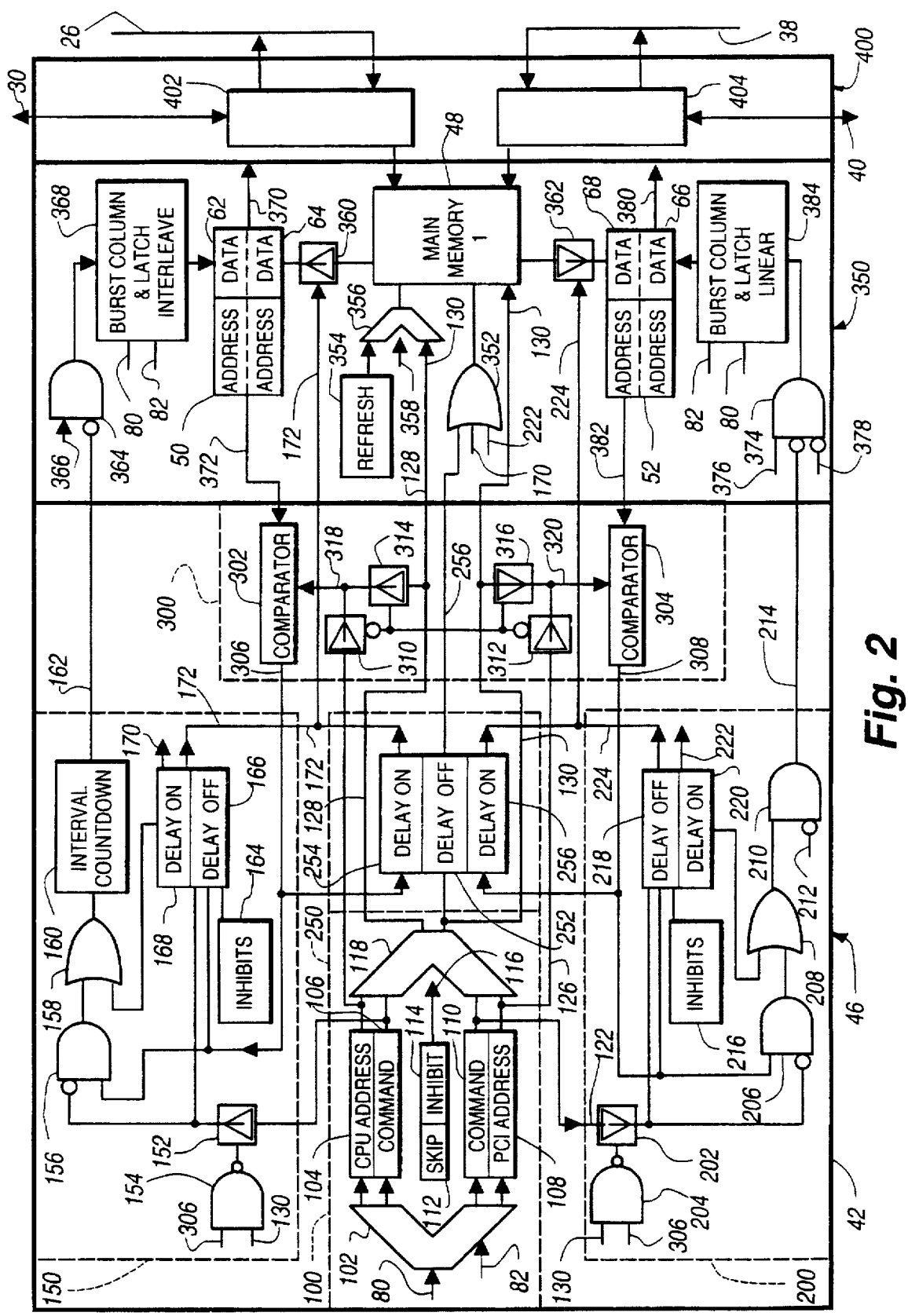
FIG. 2 is a block diagram of a memory block unit incorporating distributed cache and cache arbitration and control circuits.

The hardware of one of these units, unit 42, is shown in greater detail in FIG. 2. Unit 42 consists generally of an arbitration and control section 46. Within arbitration and control section 46 of memory block A 42 there are five basic hardware modules.

Module 100 contains hardware for the uploading of address and command from the system arbitration and control unit 78 to the local bus 104, 106 and PCI bus 108, 110 address and command buffers. Module 100 also contains hardware for downloading of these buffers to main memory 48 when such access is required.

Module 150 contains the hardware for processing local bus read hits and misses, and module 200 contains the circuitry for handling PCI bus read-hits and misses. Hardware module 250 contains the circuitry for handling a write hit or miss as requested by either the PCI or local bus. Hardware module 300 contains the comparator circuitry necessary to classify reads or writes as a hit or a miss. Hardware module 350 contains the main block memory, the distributed cache directories and data 52, 50 for the PCI bus 36 and the local bus 22, and the refresh circuitry connected with maintaining a volatile DRAM main memory. The last hardware module, module 400, contains the input/output control and data latching required for memory block 42.

Referring specifically to hardware module 100, this module consists of demultiplexer 102, local bus address 104 and command 106 buffers, PCI bus address 108 and command 110 buffers, multiplexer 118 and multiplexer drivers 112 and 114. Demultiplexer 102 is driven by control signals received from the system arbitration and control unit 78 over signal lines 82. Address and command is provided over signal lines 80. In response to a control signal on lines 82, an address and command available on lines 80 is directed by demultiplexer 102 to the appropriate buffers, either local 104, 106 or PCI 108, 110.

If narrow JEDEC® address architecture is used then address and command line 80 will convey multiplexed address information in the form of serially transmitted upper (row) and lower (column) address bytes. Upper bytes will be loaded by demultiplexer 102 into the upper bytes of the appropriate buffers either 104 or 108 and lower bytes will be loaded by demultiplexer 102 into the lower bytes of the appropriate buffers either 104 or 108. If only lower address bytes are transmitted then loading of buffers 104 or 108 will involve writing only to the lower bytes of the buffer leaving the upper bytes unchanged. This latter mode of addressing reduces the transmission time for JEDEC® standard address information involving consecutive address read/write requests directed to different columns (lower bytes) within the same row (upper byte) of memory. A burst write in this context is a series of consecutive writes to the columns within the same row of memory.

Multiplexer 118 is involved in the downloading of the contents of local bus buffer 104, 106 or PCI bus buffers 108, 110 to main memory. The determination of which of these buffers to be downloaded to main memory, when these buffers are to be downloaded to main memory and if these buffers are to be downloaded to main memory is made by skip and inhibit multiplexer control circuits 112 and 114. Skip circuit 112 is responsible for determining which is the next buffer to be processed and for determining whether that buffer requires a memory download. If, for example, skip circuit 112 determines that the buffer eligible for downloading can be handled instead through cache as a read hit, then the downloading of that buffer will be skipped. Once it has been determined by skip circuitry 112 which is the next buffer to be downloaded, then inhibit circuitry 114 determines when the appropriate time for that downloading is. If, for example, main memory is currently under a refresh or processing a prior download, then inhibit circuit 114 will prevent multiplexer signal 116 from enabling the multiplexer in choosing which buffer to download until such time as the inhibiting factors have been removed.

Signals emanating from hardware module 100 include signal 120 which contains the command available in command buffer 106. This command, either a read or write, would have been initially obtained by the system arbitration and control unit off the W/R line on the local bus. Signal 122 contains the command, read/write, in the PCI bus command buffer 110. This signal was originally derived from the PCI bus C/BE# multiplexed control line as described in the ensuing discussion of PCI bus protocols. Signal line 124 contains the address downloaded from system arbitration and control unit 78 and initially derived from the local bus A[31:3] address line. Signal line 126 contains the address downloaded from the system arbitration and control unit from the PCI bus and initially available on the multiplexed AD lines of that bus. Signal lines 128 and 130 contain respectively the address and command, read/write, downloaded to main memory by multiplexer 118 from either the local bus buffers 104, 106 or PCI bus buffers 108, 110.

The next hardware module 150 contains the circuitry connected with processing read hits and misses originating from the local bus. Transmission gate 152 imposes a precondition on the processing of a local bus buffer 106 read. NAND gate driver 154 accepting signal inputs 306 and 128 requires in order to enable the transmission gate 152 that there not be a write command being processed at the memory level which requires updating of stale data found in local bus cache 50. This condition would be present, for example, when local bus cache comparator line 306 was active and when memory level command line 130 was active indicating that a write was in process and local bus cache 50 contained stale data.

When the disabling conditions are not found, transmission gate 152 would be enabled. The enabled output of transmission gate 152 is one input of AND gate 156. The other input is from local bus comparator 302 via signal line 308. When AND gate 156 senses a read command from the local bus buffer and a hit on line 306, it is active. Under these conditions, a read hit would be in order and all data is read from local bus cache 50. The enabled output of AND gate 156 would be presented to an input of OR gate 158 thereby driving burst interval countdown circuit 160, an output of which is burst enable signal 162. A burst read is defined to be the serial transfer of data packets (columns) from a row of cache.

If, alternatively, a read hit is not detected on AND gate 156, then a read miss would be detected in circuits 166. Circuit 166 detects the presence of a local bus buffer read miss. If, for example, a read is present on enabled transmission gate 152 output and the AND gate 156 has not detected a read hit, then a read miss is being processed. Skip circuitry 112 will identify local bus buffers 104, 106 as requiring a memory download. When the contents of local bus buffers 104, 106 have been copied to main memory, inhibit circuit 164 will sense that condition. This condition in conjunction with a read miss on lines 120 and 308 activates delay off circuit 166. When delay off circuit 166 is enabled, signals 172 and 170 are active. Signal 172 will enable transmission gate 360. Signal 170 will activate main memory 48. Under these conditions the requested address and data will be uploaded from main memory 48 to cache 50. At an appropriate interval after activation of circuit 166, delay on circuit 168 will enable its output thereby transmitting an active signal to an input of OR gate 158 which will drive burst interval countdown circuitry thereby emitting a burst enable signal 162. After initial loading of cache 50 from main memory 48, all data is read in burst mode from cache 50.

The next hardware module 200 is almost identical to that of hardware module 150 except for those differences required by the difference in bus protocols on the PCI as opposed to the local bus. Transmission gate 202 specifically imposes the precondition on PCI buffer read analysis that there not be a current memory write access which requires updating of the contents of PCI cache 52. If this limiting condition is indicated, then lines 130 and 308 serving respectively as the memory level command status and PCI cache comparator inputs to AND gate 204 will be active. Under these conditions NAND gate will be inactive thereby disabling transmission gate 202.

When the limiting condition is removed from the inputs of NAND gate 204 then transmission gate 202 will be enabled. Under these circumstances a PCI bus read hit will be detected by AND gate 206 when its input from PCI command buffer 110 indicates a read request and its signal input 308 from PCI cache comparator 304 indicates a hit. If this condition is detected, then AND gate 206 sends an active signal to an input of OR gate 208 which in turn sends an active signal to an input of AND gate 210. As long as an active output from OR gate 208 is coupled with a active FRAME# signal from the PCI control bus 40, then the PCI burst mode signal emanating from AND gate 210 will continue to be active. The PCI bus, unlike the local bus, supports burst modes of variable length.

If, alternatively, a read hit is not detected on AND gate 206, then a read miss would be detected in circuits 218. Circuit 218 detects the presence of a PCI bus buffer read miss. If, for example, a read is present on enabled transmission gate 202 output and the AND gate 206 has not detected a read hit, then a read miss is being processed. Skip circuitry 112 will identify PCI bus buffers 108, 110 as requiring a memory download. When contents of the PCI bus buffers have been copied to main memory, inhibit circuit 216 will sense that condition. That condition in conjunction with a read miss on lines 122 and 308 activates delay off circuit 220. When delay off circuit 218 is enabled, signal 224 and 222 are active. Signal 224 will enable transmission gate 362. Signal 222 will activate main memory 48. Under these conditions the requested address and data will be uploaded from main memory 48 to cache 52. At an appropriate interval after activation of circuit 218, delay on circuit 220 will enable its output thereby transmitting an active signal to an input of OR gate 208 which will enable an input of AND gate 210. As long as the FRAME# input to AND gate 210 is also active, a burst enable signal 214 will be present at the output of AND gate 214.

The next hardware module 250 is connected with processing memory access writes. When a write signal is detected on line 130 by delay off circuitry 252, an active signal 258 is sent to the inputs of OR gate 352 thereby enabling access to main memory 48. If concurrently a write hit is detected on the local bus cache comparator 302 by delay on circuit 254, then an active signal 172 will be sent to transmission gate 360 enabling the copying of new data from main memory 48 to replace the stale data in cache 50. If concurrently a write hit is detected by delay on circuit 256 with respect to PCI cache 252, then an active signal 224 will be passed to transmission gate 362 thereby enabling the copying of data written to main memory to cache 52 to refresh stale data in the PCI cache. Thus, hardware module 250 handles the processing of write hits and misses.

The next hardware module 300 is generally concerned with handling local bus cache comparisons and PCI bus cache comparisons by means of comparators 302 and 304, respectively. Local bus cache comparator 302 has two inputs: input 372 from an address portion of cache 50 and input 318 from either transmission gate 310 or transmission gate 314. PCI cache comparator 304 has two inputs: specifically, signal 382 from an address portion of cache 52 and signal 320 from either transmission gate 312 or transmission gate 316.

Transmission gates 310, 312 operate in unison; transmission gates 314, 316 operate in unison and in opposition to transmission gates 310, 312. When one pair is enabled, such as 310, 312, the other is disabled. Transmission gate 310 inputs are coupled to local bus address buffers 104; signal lines 124 and transmission gate 312 inputs are coupled to the PCI address buffers 108 signal lines 126. Transmission gates 314 and 316 inputs are coupled to address lines 128.

Transmission gates 310 and 312 are driven active, in other words, enabled when control line 130 indicates a read. Alternately, when control line 130 indicates a write, transmission gates 310 and 312 are disabled and transmission gates 314 and 316 are enabled. This transmission gate circuitry is required in order to maintain cache coherency. During a write access to main memory 48, caches 50, 52 in memory block 42 are unified, and during a read access, caches 50, 52 are distributed. This ensures cache coherency amongst all caches in a given memory block during a write while still allowing for each cache to perform in a distributed manner when a read is being processed.

The next hardware module 350 contains main memory 48, local bus and PCI bus caches 50 and 52, respectively, and refresh circuitry 354. Local bus cache 50, data output 370, is driven by burst column and latch circuitry 368. Circuit 368 is programmed in the case of a Pentium® local bus for burst generation in the Intel® interleaved burst mode format. When a burst enable signal 162 is detected at the inputs of AND gate 364, and is coupled with CPU clock signal 366, the output of AND gate 364 enables the circuitry in burst column and latch circuit 368. The output of burst column and latch circuit 368 causes specific data packets contained in cache 50 to be output.

Cache 52, the PCI cache for this particular memory block, provides linear burst mode data on signal lines 380. The operation of cache 52 is determined by burst column and latch circuitry 384. This circuitry is preprogrammed to a linear burst mode appropriate for the PCI bus protocol. The burst column and latch circuitry 384 is activated when AND gate 374 detects the presence of PCI clock signal 376, a burst enable PCI signal 214, and the absence of a wait state introduced by the PCI bus master in the form, for example, of an IRDY# signal. When these conditions are detected, burst column and latch circuitry 384 is enabled by the output of AND gate 374. The output of burst column and latch circuit 384 causes specific data packets contained in cache 52 to be output in an PCI linear burst mode format on data lines 380.

If wide DRAM memory architectures are being utilized in conjunction with relatively narrow buses, it is desirable that a read hit be processed commencing at varied locations within a given row of data in caches 50, 52. Data bursts could then originate at different locations within a row. In order to facilitate this capability, burst column and latch circuit 368 and 384 would contain a start column address buffer and latch which is independently programmable over input lines 80 and 82. Under these circumstances the address portion of 50, 52 would contain the most significant bits of an address corresponding to a row in DRAM main memory 48.

An access to main memory 48 is enabled when any one of the inputs of OR gate 352 are active. Thus access to main memory is enabled when signal line 170 is active thereby indicating the processing of a local bus read miss, when signal line 222 is active indicating the processing of a PCI bus read miss, or when signal line 258 is active indicating the processing of a memory access write. When a memory access read miss is being processed as indicated by a read signal on main memory access command input line 130, then depending on the bus requesting the read, either transmission gates 360 or 362 will be enabled, thereby providing a path for copying address and data from main memory to the appropriate cache.

Alternately, when a write is being processed by main memory as indicated by a write on line 130, then in the event of a write miss, neither transmission gates 360 nor 362 will be enabled. In the event of a write hit, either one or both of transmission gates 360 or 362 will be enabled depending on which caches contain stale data that needs to be updated in order to maintain coherency between caches 50, 52 and main memory 48. Both caches need to be updated only if both contain data for the same memory address as that being written to.

The remaining portion of the circuitry connected with hardware module 350 is the refresh circuitry. Multiplexer 356 provides access to main memory either for the refresh address provided by refresh circuitry 354 or for the memory access address available on lines 128. Multiplexer control signal 358 is in traditional EDRAM parlance the /F signal. When signal line 358 is active, refresh address generation circuitry 354 is enabled and row by row refreshing of main memory 48 is accomplished. Alternately, when multiplexer control line 358 is not active, in other words, refresh is not in progress, then the address made available to main memory is that address present on memory access signal lines 128.

The remaining hardware module 400 handles the input/output control and data latching connected with this memory block. Circuit 402 is the input/output control and data latching connected with the local bus, and circuit 404 is the input/output control and data latching connected with the PCI bus. Control lines 30 provide the appropriate signals for local bus data management to circuit 402. For example, during a read cycle signal BRDY# would be available on a control line 30 to indicate the presence of data available to be read on bus 26. When no local bus memory access was directed to memory block 42, the circuit 402 would tristate its outputs to local bus 26.

The circuitry of unit 404 is a little more complicated due to the wait states that can be introduced on the PCI bus and the multiplexed protocol for handling both address and data. Therefore, circuitry in 404 must, through control lines 40, handle transmission and receipt handshakes with signals, TRDY#, IRDY#, and demultiplexing an AD line with signals DEVSEL and FRAME#.

The circuitry of 402, 404 and in system arbitration and control unit 78 that is connected with bus protocol and data management is set forth in the references. The basic hardware, however, for handling distributed cache and distributed arbitration and control have been set forth in FIGS. 1–2 and, although many hardware realizations of this distributive cache policy can be implemented, the central characteristics of distributed cache control from a hardware perspective have been set forth. What remains is to describe from a process point of view the method of the current invention.

Method

Overall operation of the system is shown in FIGS. 3A–D. These process flow diagrams reflect the basic considerations applicable to interfacing multiple buses with a tightly coupled and distributively cached memory. Each bus is characterized as communicating with memory in terms of: clock, announcement, command, address, wait, data, and completion. Both buses in this preferred embodiment operate in burst mode. Maximum burst duration for the PCI bus is assumed to have been initialized at the PCI bridge and burst mode interleaved/linear is assumed to have been set at the burst mode generator in each memory block.

Figure 3A:
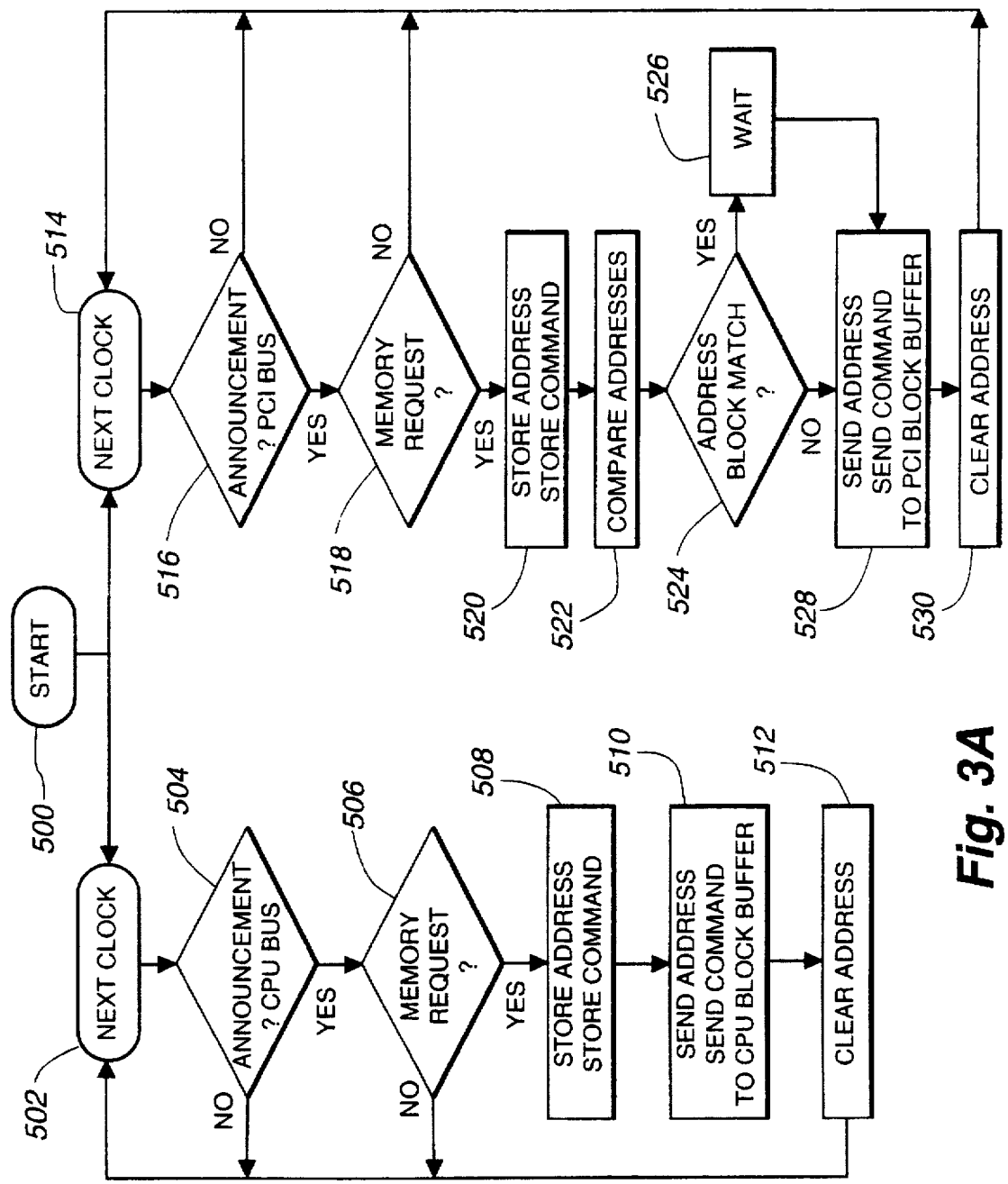
FIG. 3A is a process flow diagram of the system level arbitration.

The processing within system level arbitration and control unit 78 is shown in FIG. 3A. Commencing with start block 500, two parallel paths process announcements, commands, and addresses occurring on the local bus and the PCI bus.

On the CPU local bus, the next clock 502 determination leads to decision step 504 in which the local Pentium® bus is probed for traffic. If ADS# and a valid address are present, then there is an announcement on the local bus 22 and control is passed to decision block 506. Alternately, if there is no announcement on the CPU bus, then control returns to process block 502 for a determination of the status of the local bus coinciding with the next clock cycle. When an announcement is detected in decision block 504, then control is passed to decision block 506 to determine if the bus traffic concerns a memory request or an I/O request as indicated by line M/IO#. If the announcement and request is not for memory, then control returns to process block 502. If, alternately, there is a request for a valid memory address, then in process block 508 the address on line A[31:3] and the command, read/write, on line CPUW/R# are stored in a system level local bus address and command buffer in system arbitration and control unit 78.

Next, in process 510 the address and the command are sent over either line 80 or line 84 as shown in FIG. 1, depending on the memory block to which they are directed. The address and command are stored in memory block-level local bus buffers in the appropriate memory block 42 or 44 as determined by control signals 82 or 86. Subsequently, in process 512 the address that was stored in the system level local bus address buffer in step 508 is cleared. Then control returns to process 502 for a determination of the next clock.

On the PCI bus the clock runs slower than the local bus. Nevertheless processing of the PCI bus announcements, commands, and addresses by the system level arbitration and control unit 78 is identical to that for the local bus except for issues of priority of access in the event of concurrent requests directed to the same memory block.

The PCI bus processing begins at the next clock 514 determination. This leads to the determination in step 116 of bus traffic on the PCI bus 36. If FRAME# is asserted and a valid address AD are present, then there is an announcement and control is passed to decision block 518. Alternately, if there is no announcement on the PCI bus, then control returns to process block 514 for a determination of the status of the bus coinciding with the next clock cycle. When an announcement is detected by decision block 516, then control is passed to decision block 518 to determine if the PCI bus traffic concerns a memory request or an I/O request. If the announcement and request is not for memory, then control returns to process block 514. If, alternately, there is a request for a valid memory address, then in process block 520 the address on line AD and the command, read or write, on line C/BE# is stored in an address and command buffer respectively.

At this point arbitration may be needed if a concurrent request directed to the same memory block is being processed on the CPU path 502, 504, 506, 508. If concurrent requests are for addresses contained in separate memory blocks, then they can be processed in parallel by control lines 82, 86 servicing, respectively, memory blocks 42 and 44 as shown in FIG. 1. If, alternately, concurrent PCI and local bus requests are directed to addresses mapped to one memory block, then priority will need to be established. In the preferred embodiment, priority control is passed from process 520 to process 522 for a comparison of the addresses stored in process steps 508 and 520. Then in decision process 524, a determination is made as to whether the address announced by the local bus 22 and the PCI bus 36 are mapped to the same memory block. If the decision is in the affirmative, then in process 526 a wait state is introduced in the processing of the PCI traffic, thereby giving priority to local bus traffic. It is desirable to give priority to the local bus because it is the faster bus and because its memory accesses are of a defined and shorter duration than those of the PCI bus. After the wait state control passes to process 528. If, alternately, the result of decision 524 is that the addresses being concurrently processed are not mapped to the same memory block, then in process 528 the address and the command stored in step 520 are sent over either line 80 or line 84 as shown in FIG. 1, depending on the memory block to which they are directed. The address and command are stored in memory block-level PCI buffers in the appropriate memory block 42 or 44.

Subsequently, in process 530 the address that was stored in the system level PCI address buffer in step 520 is cleared. Then control returns to process 514 for a determination of the next clock.

It should be noted that in this one preferred embodiment, arbitration of priority between concurrent requests, of mapping a request to memory or I/O, and of mapping a memory request to a specific memory block is being handled at a system level. It would be equally possible to handle these tasks at a memory block-level. This would increase system throughput and would require that most of the circuitry connected with implementing the processes of FIG. 3A be duplicated in each memory block. Either approach may be suitable.

Figure 3B:
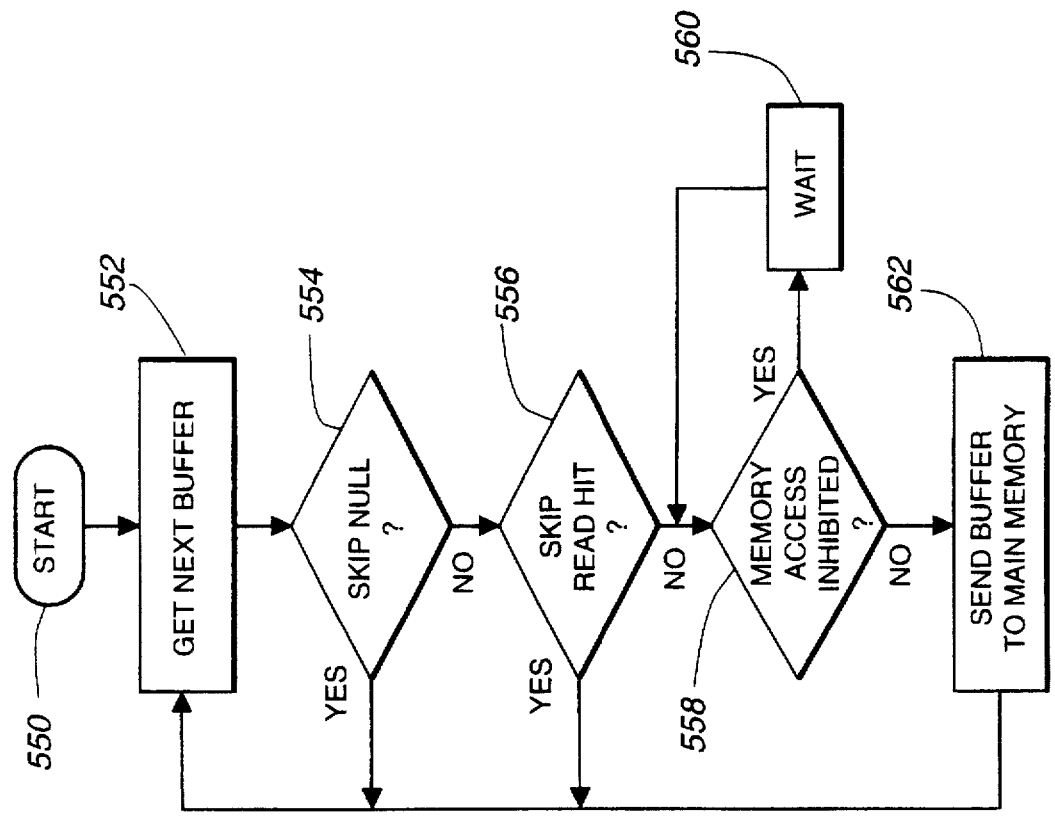
FIG. 3B is a process flow diagram of the memory block-level arbitration for loading memory requests and making memory block-level main memory accesses.

FIG. 3B is a process flow diagram of memory block-level processing of memory requests and main memory accesses occurring, possibly concurrently, in each memory block. The block-level local and PCI buffers have been loaded in steps 510 and 528, respectively. It remains to process those buffers. From start block 550 control is passed to process block 552. In process 552, the determination of the next block-level buffer to be processed, and perhaps passed to block-level main memory, is commenced. Control is passed to decision 554 in which the next buffers, in this case either block-level local bus or PCI bus, are analyzed. If null, then the current buffers have not been downloaded with an address or command and control returns to process 552 for polling of the next buffers. If, alternately, the buffers contain address and control, then control passes to decision block 156 in which it is determined if the memory request can be processed as a read hit. If it can, then no main memory access is required and control returns to process 552. If, alternately, it is determined in process 556 that the buffers' request cannot be handled as a read hit, for example, block-level main memory access is required, then control is passed to decision block 558.

In decision 558 a determination is made as to whether the portion of main memory associated with this memory block is currently under an inhibit status which could, for example, be due either to a refresh of this block's main DRAM memory as indicated by the signal /F 358 and /RE 170, 258, 222 being active, or by a main memory access of this block as indicated by signal /RE being active. /RE will be active when either a block-level read miss or write is being handled. If either of these inhibits are taking place, then control passes to process 560 for the introduction of a wait state after which control returns to decision 558. Alternately, once the inhibit is removed and/or if no inhibit is sensed, control passes directly from decision 558 to process 562 in which the block-level buffers, in this case either local or PCI, are presented to block-level main memory for processing. Subsequently, control passes to process 552. In FIG. 3B a cycle of memory block-level buffer analysis and block-level main memory downloading has been detailed.

Figure 3C:
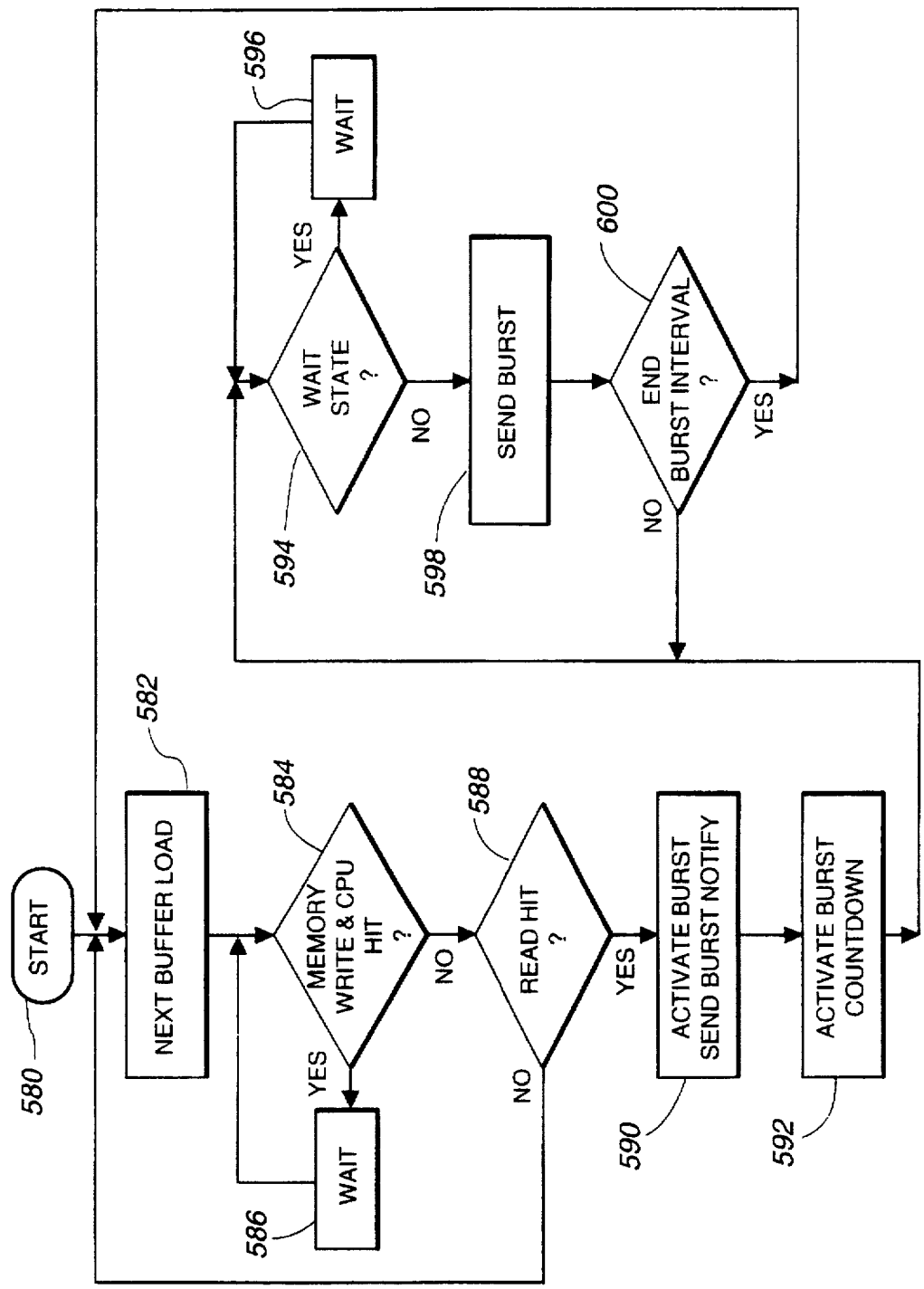
FIG. 3C is a process flow diagram of the memory block-level arbitration for processing read hits.

In FIG. 3C the processing of a read hit at a memory block-level for the local bus buffers is detailed. The processes shown apply generally to each of the memory block-level bus buffers. In other words, the process shown in FIG. 3C occurs with respect to both the local and PCI bus memory block-level buffers.

The process begins with start block 580 and control passes to process block 582 in which the loading of a new set of address and control requests into the local bus buffers is detected. Control is then passed to decision block 586 in which it is determined whether at the block main memory level a write condition is present, and further, at the local bus buffer level whether a hit condition has been detected, in which event control passes to process block 588 for the introduction of a wait state. This allows time for the current memory access to refresh stale cache data in the local bus cache within this memory block.

Subsequently, after the introduction of the wait state in process block 586, control returns to decision block 584 and proceeds in that 584, 586 loop until such time as the current memory access no longer involves a write condition coupled with a local bus cache write hit. Once that condition has been removed, and irrespective of whether a memory access is taking place, control proceeds to decision 588 in which a determination is made as to whether a read is requested by the memory block-level local bus buffers, and further whether the address to which the read is directed is currently contained in memory block-level local bus cache. In the event that a read hit is not detected, then no read cycle independent of main memory access can take place and control returns to process block 582. Alternately, if a read hit condition is indicated, then in process 590 the burst mode is activated for the memory block-level local bus cache. If the signal protocol on the local bus calls for a burst notification, that command is sent at this point. If this process loop were directed to the PCI bus, rather than the local bus, this burst notification would be evidenced by the TRDY# line being activated.

Subsequently, in process block 592, to which control has passed, a burst countdown is activated, which in this case is necessary, because Pentium® local bus burst cycles are of a predetermined length. This process could be eliminated in the event of a PCI bus, in which case burst length is not fixed. In any event, control is passed to decision block 594 in which case a determination is made as to whether a wait state is required. There are no wait states on the local bus, but if this process were for the PCI bus, for example, a determination would be made as to whether IRDY# were asserted. If asserted, indicating that the master wanted a wait state before receiving data, then control would pass to process block 596 for the introduction of a wait state and return to decision block 594 for determination of when a wait state was no longer present. Once the determination in decision block 594 is in the negative, in other words, that no wait state exists, then control passes to process block 596 in which the next data packet is transmitted from the memory block-level local bus cache. Control subsequently passes to decision block 600 for determination as to whether or not the burst interval has ended. In the case of a Pentium® bus, this would involve determining whether the burst countdown had reached a null state in which case the burst interval just engaged in was the last interval. In the case of a PCI bus, this would involve a determination as to whether FRAME# had been deactivated, in which case the last block of data would be the last block involved in the burst interval. In the event these determinations were in the affirmative, in other words, that a burst interval had ended, then control would pass from decision block 600 to process block 582. Alternately, if it had been determined that the burst interval was not complete, then control would pass to decision block 594. This, then, completes the processing of a basic read hit cycle applicable to any cache in any one of a number of memory blocks.

Figure 3D:
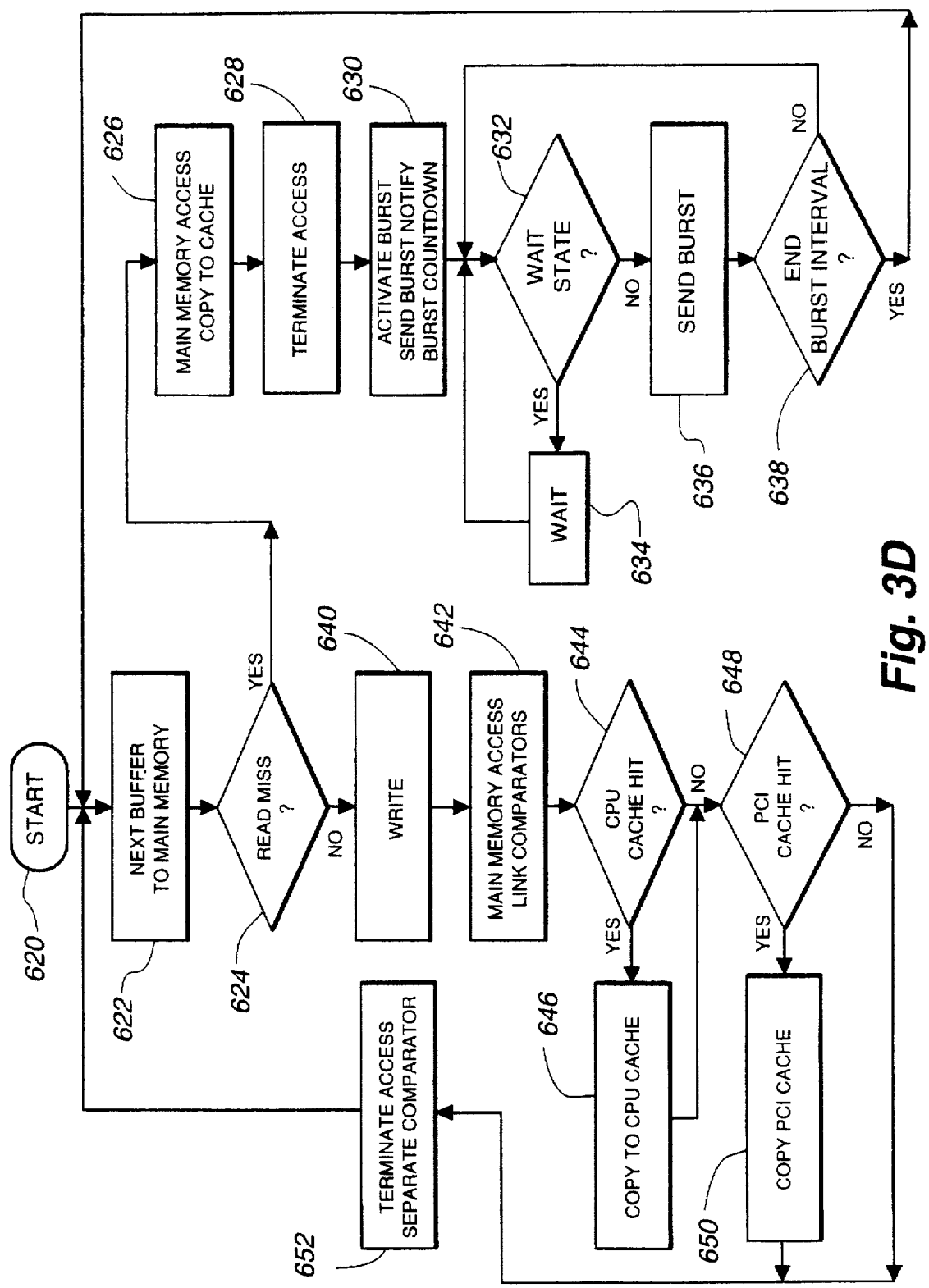
FIG. 3D is a process flow diagram of the memory block-level arbitration for processing read misses and writes.

In FIG. 3D, the processing of memory block requests requiring a main memory access, specifically a read miss and a write hit/miss, is detailed. Beginning at start block 620, control is passed to process block 622 in which the passage 662 of the next buffers from the control and arbitration unit of a given memory block to the main memory of that block is indicated. At that point control is passed to decision 624 for determination of whether that specific memory access is a read miss access. The determination of a read miss is made by comparing only the cache directory dedicated to the bus from which the read request was received and the requested address. The other caches of the memory block devoted to other buses are not involved in this determination.

In the event a read miss is being processed, then control is passed to process 626 in which the appropriate cache servicing the specific bus from which the read request was received is enabled, and a copy of the data to be read is uploaded to the block-level cache for that bus from the main memory of that block. Control is subsequently passed to process block 628 in which, after the upload to the appropriate cache has taken place, main memory access is terminated. At that point, what had been a read miss is now processed similarly to a read hit: control is passed to process block 630 in which burst mode is activated; a burst notification, as mentioned previously and if required by the bus protocol is sent; and a burst countdown in the case of a Pentium® bus read request is activated. After this process is completed, control is passed to decision 632 for determination as to whether a wait state has been introduced into the cache access. If, for example, the read access is from the PCI bus, then the assertion of IRDY# would indicate a wait state was required until the master was ready to receive the data available within the memory block-level PCI cache. If decision 632 is in the affirmative, then control is passed to process block 634 for the introduction of a wait state and subsequent return to decision block 632. Once the removal of a wait state or absence of a wait state is detected, control is passed to process block 636 for transmission of the next data burst.

Then control is passed to decision block 638 in which it is determined whether the burst interval is over. In the case of the local bus, this would be indicated by the null state of the burst countdown; in the case of the PCI bus this would be indicated by the deactivation of FRAME#. In the event the determination is in the negative, for example, that the burst cycle is not completed, then control returns to decision block 632. Alternately, if it is determined that the burst interval has terminated, then control is passed to process block 622 for retrieval of the next buffers requiring access to block-level main memory.

Alternately, if in decision block 624 a read miss is not indicated, then the block-level main memory access taking place is a write cycle 640. Control then is passed to process 642 in which all cache comparators in a specific memory block are linked and perform as a unified rather than distributed cache. The comparison being made by these comparators is between all cache directories in the memory block, in this case a local bus and PCI bus cache, and the address present in main memory. This is required to assure that all stale data irrespective of the cache in which it is found is updated during this write hit.

Subsequently, control is passed to decision block 644 for determination of whether a local bus write cache hit is detected. In the event the address written to in block-level main memory is also contained in the local bus cache associated with that memory block, then control is passed to process block 646, in which case the transmission gate to the local bus cache is enabled and a copy of the new data just written to main memory is also copied from main memory to the appropriate row in the local bus cache. Control is then returned to decision block 648. Alternately, if there is not a local bus cache write hit as determined in decision block 644, then control is also passed to decision block 648. This is required because on a memory write both the local and PCI caches may contain identical addresses requiring updating of stale data.

In decision block 648, determination is made as to whether a hit has been experienced in the memory block-level PCI cache. In the event that it has, control is passed to process block 650 for subsequent uploading of a copy of the data just written to main memory to the PCI cache. Control is then passed to process block 652. Alternately, if a determination 648 is made that there is no PCI cache write hit, then control is passed also to process block 652 for terminating main memory access and for uncoupling the comparators of the memory block and returning them to their normal separated state. In this state each comparator compares a memory block-level cache directory with the address present in the memory block-level address buffer associated with that bus.

This then completes the basic distributive arbitration and control processing associated with this particular preferred embodiment of the present invention.

As compared to an L2 cache serving all of main memory, the current distributive cache and cache arbitration and control exhibits the following advantages. First, any memory requests on the local and PCI bus, including dual write hits, can be processed concurrently in the current system, provided that the hits occur in different memory blocks. Any memory requests in an L2 cache are handled serially. Second, of those memory requests on the local and PCI buses which are directed to a single memory block, the following can be performed concurrently in the current system: dual read hits, a read miss and a read hit, a-read hit and a write miss, and a read hit and a write hit; provided in the latter case the hit is not in the cache involved in the read hit. By contrast, in an L2 cache all memory requests are handled serially.

Signals

A more complete appreciation of process diagrams of FIGS. 3A–D will be had by reference to the following discussion of bus level and cache level signals.

PCI

Address and Data Pins

AD[31:0] Address and Data are multiplexed on the same PCI pins. A bus transaction consists of an address phase followed by one or more data phases. PCI supports both read and write bursts. The address phase is the clock cycle in which FRAME# is asserted. During the address phase AD[31:0] contain a physical address (32 bits). For I/O, this is a byte address; for configuration and memory, it is a DWORD address. During data phases AD[07:0] contain the least significant byte (lsb) and AD[31:24] contain the most significant byte (msb). Write data is stable and valid when IRDY# is asserted and read data is stable and valid when TRDY# is asserted. Data is transferred during those clocks where both IRDY# and TRDY# are asserted.

C/BE[3:0]# Bus Command and Byte Enables are multiplexed on the same PCI pins. During the address phase of a transaction, C/BE[3:0]# define the bus command (refer to Section 3.1. for bus command definitions).

During the data phase C/BE[3:0]# are used as Byte Enables. The Byte Enables are valid for the entire data phase and determine which byte lanes carry meaningful data. C/BE [0]# applies to byte 0 (lsb) and C/BE[3]# applies to byte 3 (msb).

FRAME# Cycle Frame is driven by the current master to indicate the beginning and duration of an access. FRAME# is asserted to indicate a bus transaction is beginning. While FRAME# is asserted, data transfers continue. When FRAME# is deasserted, the transaction is in the final data phase.

IRDY# Initiator Ready indicates the initiating agent's (bus master's) ability to complete the current data phase of the transaction. IRDY# is used in conjunction with TRDY#. A data phase is completed on any clock both IRDY# and TRDY# are sampled asserted. During a write, IRDY# indicates that valid data is present on AD[31:0]. During a read, it indicates the master is prepared to accept data. Wait cycles are inserted until both IRDY# and TRDY# are asserted together.

TRDY# Target Ready indicates the target agent's (selected device's) ability to complete the current data phase of the transaction. TRDY# is used in conjunction with IRDY#. A data phase is completed on any clock both TRDY# and IRDY# are sampled asserted. During a read, TRDY# indicates that valid data is present on AD[31::00]. During a write, it indicates the target is prepared to accept data. Wait cycles are inserted until both IRDY# and TRDY# are asserted together.

STOP# Stop indicates the current target is requesting the master to stop the current transaction.

DEVSEL# Device Select when actively driven, indicates the driving device has decoded its address as the target of the current access. As an input, it indicates whether any device on the bus has been selected.

Pentium® Local Bus

Address and Data Pins

BRDY# Burst Ready allows the CPU to insert wait states as necessary to meet the memory subsystems timing requirements.

A[31:3] Address lines for the Pentium®.

D[63:0] Data lines for the Pentium®.

ADS# Address Strobe indicates the availability of a valid address on the local bus.

NA Next Address allows for pipelining address and data commands by signaling the processor that, although the data portion of the previous command is still being processed, the address portion is complete and a new address for the next operation can be made available on the bus.

We claim:

1. In a computer system including; a plurality of buses, each bus serving at least one device, and each bus serving to communicate direct memory access read/write requests, data, and main memory addresses, from a device to a main memory which is tightly coupled to the devices; a distributed cache memory system, comprising:

a first group of one or more devices requiring direct memory access;

a second group of one or more devices requiring direct memory access;

a first bus connecting said first group of devices directly to the main memory;

a first cache connected directly to said first bus and to the main memory;

a second bus connecting said second group of devices directly to the main memory;

a second cache connected directly to said second bus and to the main memory;

a cache memory control and arbitration unit coupled to said first and second cache, said first and second bus, and to said main memory for processing concurrent direct memory access requests from said first and said second bus.

2. The distributed cache memory system as set forth in claim 1, wherein:

said cache memory control and arbitration unit couples said first and second cache during a write request and uncouples said first and second cache during a read request.

3. The distributed cache memory system as set forth in claim 2, wherein:

said cache memory control and arbitration unit includes means for copying data written to an address located only in said main memory to said main memory;

said cache memory control and arbitration unit includes means for copying data written to an address located in said main memory and said first cache, to said main memory and said first cache;

said cache memory control and arbitration unit includes means for copying data written to an address located in said main memory and said second cache, to said main memory and said second cache; and said cache memory control and arbitration unit includes means for copying data written to an address located in said main memory, said first cache and said second cache, to said main memory, said first cache and said second cache.

4. The distributed cache memory system as set forth in claim 2, wherein:

said cache memory control and arbitration unit includes means for responding to a read request communicated on said first bus and directed to an address located only in the main memory by copying said address and data from main memory to said first cache and transmitting said data from said first cache to said first bus;

said cache memory control and arbitration unit includes means for responding to a read request communicated on said first bus and directed to an address and data located both in the main memory and in said first cache by transmitting said data from said first cache to said first bus;

said cache memory control and arbitration unit includes means for responding to a read request communicated on said second bus and directed to an address located only in the main memory by copying said address and data from main memory to said second cache and transmitting said data from said second cache to said second bus; and said cache memory control and arbitration unit includes means for responding to a read request communicated on said second bus and directed to an address and data located both in the main memory and in said second cache by transmitting said data from said second cache to second bus.

5. The distributed cache memory system as set forth in claim 1, wherein:

said cache memory control and arbitration unit includes means for determining priority for processing direct memory access requests from said first and said second bus.

6. The distributed cache memory system as set forth in claim 1, wherein:

said cache memory control and arbitration unit includes means for pipelining memory access requests.

7. The distributed cache memory system as set forth in claim 1, wherein:

said cache memory control and arbitration unit includes means for handling burst read requests.

8. The distributed cache memory system as set forth in claim 1, wherein:

said cache memory control and arbitration unit includes means for handling burst write requests.

9. A computer system including:

a first bus connected to a first group of one or more devices, a second bus connected to a second group of one or more devices, a main memory controller connected to the first and second bus, and a main memory element connected directly to the main memory controller and the first and second bus; an improved main memory element, comprising:

a first cache connected directly to said first bus and to the main memory element;

a second cache connected directly to said second bus and to the main memory element;

a cache memory control and arbitration unit coupled to said first and second cache, said first and second bus, the main memory element and to the main memory controller for processing concurrent direct memory access requests from the first and the second bus.

10. The improved main memory element as set forth in claim 9, wherein:

said cache memory control and arbitration unit couples said first and second cache during a write request and uncouples said first and second cache during a read request.

11. The improved main memory element as set forth in claim 10, wherein:

said cache memory control and arbitration unit includes means for copying-data written to an address located only in the main memory element to the main memory element;

said cache memory control and arbitration unit includes means for copying data written to an address located in the main memory element and said first cache, to the main memory element and said first cache;

said cache memory control and arbitration unit includes means for copying data written to an address located in the main memory element and said second cache, to the main memory element and said second cache; and said cache memory control and arbitration unit includes means for copying data written to an address located in the main memory element, said first cache and said second cache, to the main memory element, said first cache and said second cache.

12. The improved main memory element as set forth in claim 10, wherein:

said cache memory control and arbitration unit includes means for responding to a read request communicated on said first bus and directed to an address located only in the main memory element by copying said address and data from the main memory element to said first cache and transmitting said data from said first cache to said first bus;

said cache memory control and arbitration unit includes means for responding to a read request communicated on said first bus and directed to an address and data located both in the main memory element and in said first cache by transmitting said data from said first cache to said first bus;

said cache memory control and arbitration unit includes means for responding to a read request communicated on said second bus and directed to an address located only in the main memory element by copying said address and data from the main memory element to said second cache and transmitting said data from said second cache to said second bus; and said cache memory control and arbitration unit includes means for responding to a read request communicated on said second bus and directed to an address and data located both in the main memory element and in said second cache by transmitting said data from said second cache to second bus.

13. The improved main memory element as set forth in claim 9, wherein:

said cache memory control and arbitration unit includes means for determining priority for processing direct memory access requests from said first and said second bus.

14. The improved main memory element as set forth in claim 9, wherein:

said cache memory control and arbitration unit includes means for pipelining memory access requests.

15. The improved main memory element as set forth in claim 9, wherein:

said cache memory control and arbitration unit includes means for handling burst read requests.

16. The improved main memory element as set forth in claim 9, wherein:

said cache memory control and arbitration unit includes means for handling burst write requests.

17. A computer system including:

a first bus connected to a first group of one or more devices, a second bus connected to a second group of one or more devices, and a main memory connected directly to the first and second bus; an improved main memory, comprising:

a main memory arbitration and control unit connected to said first and second bus;

at least one memory element connected to said main memory arbitration and control unit and to said first and said second bus said memory element containing;

a) a main memory element;

b) a first cache connected directly to said first bus and to said main memory element;

c) a second cache connected directly to said second bus and to said main memory element;

d) a cache memory control and arbitration unit coupled to said first and second cache, said first and second bus, said main memory element and to said main memory arbitration and control unit for processing concurrent direct memory access requests from the first and the second bus.

18. The improved main memory as set forth in claim 17, wherein:

said cache memory control and arbitration unit couples said first and second cache during a write request and uncouples said first and second cache during a read request.

19. The improved main memory as set forth in claim 18, wherein:

said cache memory control and arbitration unit includes means for copying data written to an address located only in said main memory element to said main memory element;

said cache memory control and arbitration unit includes means for copying data written to an address located in said main memory element and said first cache, to said main memory element and said first cache;

said cache memory control and arbitration unit includes means for copying data written to an address located in said main memory element and said second cache, to said main memory element and said second cache; and said cache memory control and arbitration unit includes means for copying data written to an address located in said main memory element, said first cache and said second cache, to said main memory element, said first cache and said second cache.

20. The improved main memory as set forth in claim 18, wherein:

said cache memory control and arbitration unit includes means for responding to a read request communicated on said first bus and directed to an address located only in the main memory element by copying said address and data from main memory element to said first cache and transmitting said data from said first cache to said first bus;

said cache memory control and arbitration unit includes means for responding to a read request communicated on said first bus and directed to an address and data located both in the main memory element and in said first cache by transmitting said data from said first cache to said first bus;

said cache memory control and arbitration unit includes means for responding to a read request communicated on said second bus and directed to an address located only in the main memory element by copying said address and data from the main memory element to said second cache and transmitting said data from said second cache to said second bus; and said cache memory control and arbitration unit includes means for responding to a read request communicated on said second bus and directed to an address and data located both in the main memory element and in said second cache by transmitting said data from said second cache to second bus.

21. The improved main memory as set forth in claim 17, wherein:

said cache memory control and arbitration unit includes means for determining priority for processing direct memory access requests from said first and said second bus.

22. The improved main memory element as set forth in claim 17, wherein:

said cache memory control and arbitration unit includes means for pipelining memory access requests.

23. The improved main memory element as set forth in claim 17, wherein:

said cache memory control and arbitration unit includes means for handling burst read requests.

24. The improved main memory element as set forth in claim 17, wherein:

said cache memory control and arbitration unit includes means for handling burst write requests.

25. An integrated memory circuit for use in a computer having first and second buses, comprising:

a DRAM directly coupled to said first and second buses;

first and second memory caches for coupling to said first and second buses, each connected to cache data of selected addresses of said DRAM;

and an arbitration and control circuit connected to said first and second memory caches and said DRAM for implementing a memory cache policy among said first and second memory caches and said DRAM and for processing concurrent direct memory access requests from said first and said second bus.

26. The circuit of claim 25 wherein said first and second memory caches are first and second SRAM caches.

27. The circuit of claim 25 wherein said arbitration and control circuit is partially distributed on said chip.

28. The circuit of claim 25 wherein said first bus is a local bus and said second bus is a PCI bus.

29. The circuit of claim 25 wherein said first and second buses are data and address busses.

30. The circuit of claim 25 wherein said arbitration and control circuit arbitrates memory refresh cycles.

31. A memory system for use in a computer having a plurality of buses, comprising:

a plurality of integrated memory circuits, each including:

a memory block directly coupled to said plurality of buses;

first and second memory caches each for coupling to a respective one of said plurality of buses, each connected to cache data of selected addresses of said memory block;

an arbitration and control circuit connected to said first and second memory caches and said memory block for implementing a memory cache policy among said first and second memory caches and said memory block; and a system level control and arbitration unit for arbitrating priority between concurrent memory access requests on different ones of said buses, for determining if a request for an address mapped to either memory or input/output is for memory, and for controlling which memory block is addressed.

32. The memory system of claim 31 wherein said memory block comprises a DRAM.

33. The memory system of claim 31 wherein said memory block is subdivided into a plurality of memory blocks, and wherein said first and second caches are each subdivided into cache parts, each of said cache parts being associated with a respective one of said memory blocks.

34. The memory system of claim 31 wherein each of said caches comprises two rows.

* * * * *